UNITED STATES PATENT OFFICE.

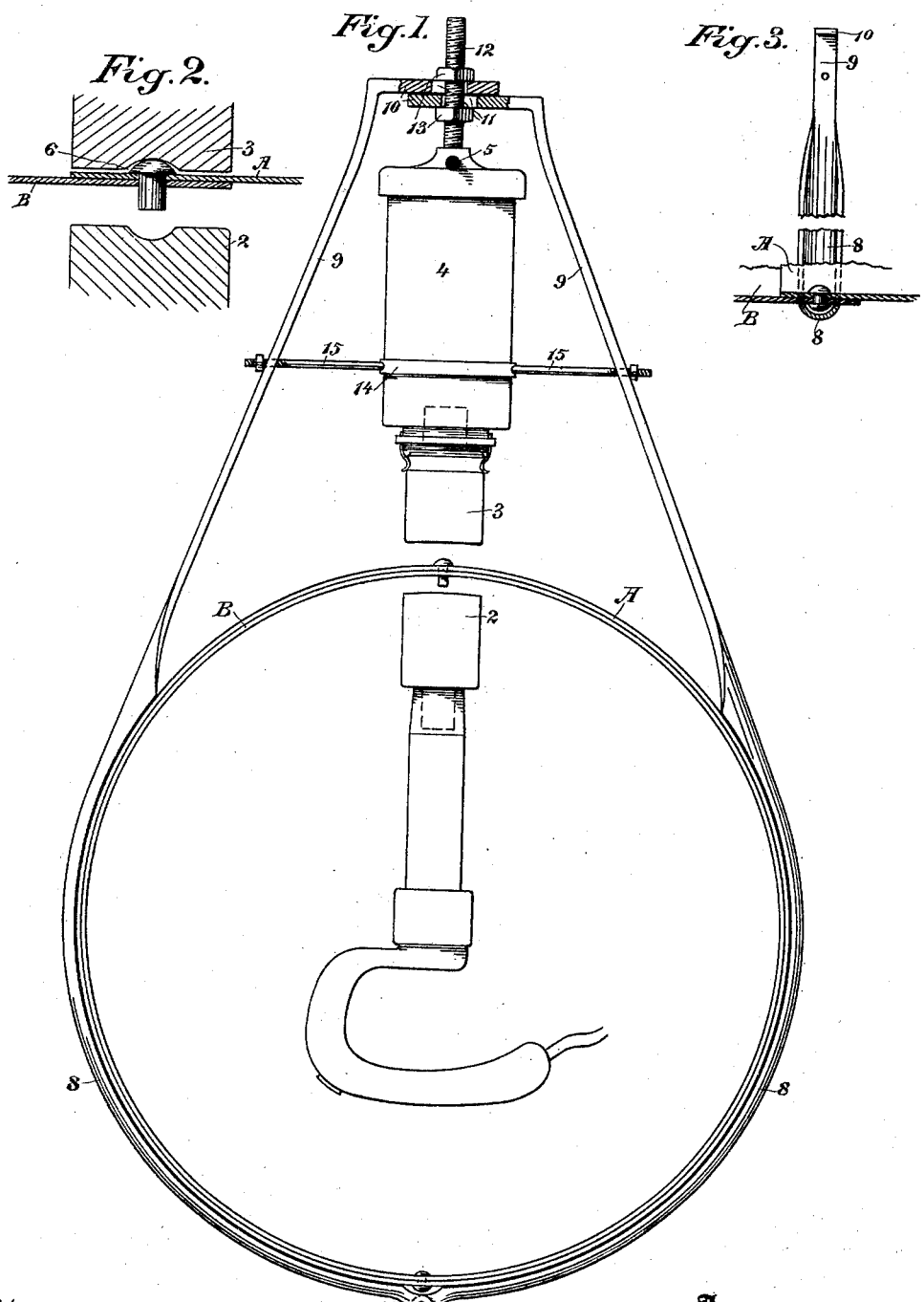

STANTON FOREMAN, OF SACRAMENTO, CALIFORNIA, ASSIGNOR TO THE SCHAW, INGRAM, BATCHER & COMPANY, OF SAME PLACE.

PIPE-RIVETING MACHINE.

SPECIFICATION forming part of Letters Patent No. 660,542, dated October 23, 1900.

Application filed July 11, 1900. Serial No. 23,232. (No model.)

*To all whom it may concern:*

Be it known that I, STANTON FOREMAN, a citizen of the United States, residing at Sacramento, county of Sacramento, State of California, have invented an Improvement in Pipe-Riveting Machines; and I hereby declare the following to be a full, clear, and exact description of the same.

My invention relates to a device which is designed for riveting together the meeting ends of pipe-sections where such pipes are being laid in trenches or in other permanent resting-places.

It consists of a pneumatic hammer and heading-tool to be employed inside the pipe and an exterior anvil and "holder-on," as it is termed, with means for supporting the same in line with the rivet, and a peculiar construction of said anvil by which I am enabled to close the end of the outer pipe-section against the inner one to prevent leakage at the joint thus formed.

My invention also comprises details of construction, which will be more fully explained by reference to the accompanying drawings, in which—

Figure 1 is an end view of pipe, showing my device attached. Fig. 2 is a longitudinal section through a pipe-joint, showing section of anvil and heading-tool. Fig. 3 is a similar view showing the construction of the holding-band.

Where large gas, water, and other pipes are to be laid in trenches or other permanent resting-places, the pipe-sections are made of certain lengths, as twenty or thirty feet, in the shop, and are then transported to the place where they are to be laid. The ends of the meeting sections are so formed that one is slipped into the other, holes being made through the two sections around the pipe ends. They are afterward riveted when in proper position in the ground. This riveting is done in various ways. Sometimes it is done by hand, in which case the striker operates from the outside of the pipe, and in pipes of large diameter another man within the pipe holds the anvil or tool against the stroke, so that they rivet upon the outside.

In some cases the pipes are riveted by means of pneumatic hammers operating to upset and form a head upon the rivet, and a holding tool or anvil of some description is properly supported against the opposite head of the rivet. The difficulty of this class of riveting is that when the head of the rivet is driven down upon the outside of the pipe it has a tendency to spring the end of the pipe or turn it outwardly in the same manner that a thin washer will be turned up when a nut is screwed strongly down upon the bolt, which passes through the washer. This turning out of the edge of the pipe causes a leakage, which where the pipes are under considerable pressure, as in the case of water-mains, is a serious matter.

It is the object of my invention to head the rivets from the inside and to provide an opposing anvil or holder of such character that it presses the outside of the pipe inwardly and acts to close the edge of the exterior section upon the interior one, thus preventing the upturning of this edge and its consequent leakage at the joint.

A and B are two sections of pipe to be joined. One of these sections is sufficiently smaller at the end to enter the end of the contiguous section, and these pipe-sections have rivet-holes punched in them during the process of manufacture, so that it is only necessary to bring the rivet-holes in line with each other, insert and head the rivets in the proper manner, and the sections will be permanently united. The pipe may thus be laid in a suitable trench for any desired distance and in readiness for subsequent use.

For the purpose of heading rivets I preferably employ any suitable pneumatic hand-tool for riveting, such as are commonly sold in the market, or any other well-known tool of this character. These tools have handles, so that they may be conveniently held by the operator, who sits inside the pipe, and by means of flexible hose conducting air from any suitable air-compressor the reciprocating piston of the hammer acts against the tool, which forms the head upon the inner end of the rivet. This tool 2 is of any suitable or desired description. It has a depression in the end of such shape as to give the desired form to the head of the rivet and to seat the latter firmly against the inside of the inner pipe. The outer rivet-head is held in place by the anvil and "holder-on," as it is termed, (shown at 4.) The anvil is carried by a plunger movable in a cylinder 4, which is supplied with air under pressure through a pipe, as shown at 5. The air-pressure against the piston within the cylinder 4 forces the anvil or holder against the exterior and previously-formed head of the rivet, and while the pressure is sufficient to enable the riveting-tool upon the inside to upset and head the rivet at that end it is sufficiently elastic to allow the tool to adjust itself to the outer head of the rivet during the operation. These devices being of common use are not here described in detail.

In order to close the end of the outer pipe upon the surface of the inner one, as previously stated, I have shown the anvil 3 made with a depression or concavity 6, which is slightly larger or more diverging than the rivet-head, so that there is an annular space or channel between the periphery of this socket and the outside of the rivet-head when the operation of riveting commences. As the operation proceeds the already-formed outer head of the rivet is gradually expanded within the socket or chamber 6 until the face of the anvil which is exterior to the socket rests upon the surface of the pipe itself at approximately the instant when the inner head of the rivet is completed. An important feature in the construction of this anvil is forming the end of such size that it reaches the edge of the outer pipe-section, and being thus closed down by the pressure of the air behind the piston, which carries it, it acts to retain the edge of the outer pipe close against the interior one and to thus close the joint and prevent any tendency to subsequent leakage at this point. The cylinder 4, which carries the piston and this anvil, is supported from the outside of the pipe by any suitable holder of the class known in shop usage technically as the "old man," and it consists of a band passing around the work to be done and having means by which the operating-tool, whether riveter, drill, or other tool, can be held in proper position to accomplish its work. In the present case I have shown the band 8, which is formed of channel or angle iron, having either a rectangular or a semicircular interior channel to fit over the line of rivet-heads which surround the pipe, the edges of the band resting upon the surface of the outer pipe and inclosing the greater portion of it; but the ends of the band extend tangentially outward, are spread or flattened, as shown at 9, and then turned at approximately right angles, as at 10, so as to overlap each other. Through these overlapping ends slotted openings 11 are made, and through these openings a screw-threaded rod or pipe 12 passes, and its inner end is screwed into or otherwise fixed to the outer end of the cylinder 4. By means of nuts 13 the stem 12 can be firmly locked to the overlapping ends 10, and by reason of the slot 11 any slight adjustments may be made to bring the parts into proper alinement with the work to be done. The cylinder 4 may also, if found desirable, be further steadied in place by means of a band 14 passing around it and rods 15 extending from it through the sides of the extended portions 9 of the band.

The band 8 is preferably made with a hinge or pivot joint, as shown at 16, so that it can be opened and placed upon the pipe at any desired point where the work is to be done, the overlapping ends 10 being then brought together in position to support the holder and anvil.

Having thus described my invention, what I claim as new, and desire to secure by Letters Patent, is—

1. In an apparatus for riveting pipe-sections together when laid, a hammer by which heads are formed upon the inner ends of rivets, a holder-on with an anvil carried thereby, and pressing against the exterior rivet-head, said anvil having a surface of contact exterior to the rivet-head socket, whereby the joint is simultaneously riveted and closed.

2. The combination in a riveting device of a pneumatic hammer and a heading-tool carried thereby adapted to form a head upon the inner end of a rivet, a holder and means for supporting the same exterior to the pipe and approximately in line with the rivet, an anvil carried thereby having the socket in the end to fit the outer head of the rivet, said socket being diverged to a greater diameter than the rivet-head, and a face upon the anvil exterior to the socket adapted to press upon the exterior pipe-surface and close the joint between the two sections when the riveting is completed.

3. The combination in a device for riveting the overlapping ends of pipes when being laid, of a pneumatic riveting-hammer, a heading-tool carried thereby adapted to form heads upon the inner ends of rivets which pass through holes in the pipe ends, a holder exterior to the pipe having an anvil with a chambered end adapted to fit the outer head of the rivet, and a face to close the pipe-joint when the riveting is completed, a holding device for said holder and anvil, consisting of a channeled band designed to fit over the heads of the circular line of rivets with its edges resting upon the surfaces of the outer pipe only, said band being flattened and extending tangentially exterior to the pipe, and having its meeting ends adapted to support the holder-on between them.

4. The combination in a riveting device for pipe-sections when being laid, of a pneumatic hammer, a tool carried thereby adapted to form heads upon the ends of rivets interior to the tube, a holder exterior to the tube, an anvil carried thereby chambered to fit the exterior head of the rivet, a support for said holder consisting of a band, channeled to inclose the circular line of rivets around the joint, with the edges of the band resting upon the surface of the pipe, a joint whereby the band-sections may be opened or closed, converging extensions of the band opposite to the joint and tangential with the pipe, said extensions being bent and overlapped, having openings therethrough, a bolt passing through the opening and fixed to the holder, and locking-nuts by which it is adjustably secured to the ends through which it passes.

5. The combination in a device for riveting the ends of pipe-sections together when being laid, of a tool adapted to form heads upon the inner ends of rivets passing through holes in the overlapping pipe ends, and a hammer by which said tool is actuated from the interior, an exterior anvil chambered to fit the outer head of the rivet, a channeled two-part band hinged together at one side adapted to fit over the circular line of rivets, and the edges rest upon the surface of the pipe, said band-sections extending tangentially away from the pipe opposite to the hinge-joint and having the converging ends bent to overlap and slotted, a screw-threaded rod passing through said slot and fixed to the holder, with adjusting and locking nuts therefor, a band surrounding the cylinder of the holder with rods extending from each side through the convergent sides of the band.

6. A support for a holder-on for pipe-riveting, consisting of a concavo-convex band partially inclosing the pipe and the circular line of rivets which join two contiguous pipe-sections, said band being hinged together at one side, and having the opposite ends flattened and extended tangentially and convergently from the pipe, and connections between said ends, and an anvil-holder in line with the rivets.

In witness whereof I have hereunto set my hand.

STANTON FOREMAN.

Witnesses:
S. H. NOURSE,
JESSIE C. BRODIE.